Jan. 5, 1960 J. L. DWYER 2,920,035
PROCESS AND APPARATUS FOR INTRODUCING MATERIALS INTO
A CONVERSION ZONE EMPLOYING A VARIABLE
HEIGHT FEEDING ZONE
Filed Dec. 30, 1955 2 Sheets-Sheet 1

INVENTOR.
JAMES L. DWYER

ATTORNEY

INVENTOR.
JAMES L. DWYER

United States Patent Office 2,920,035
Patented Jan. 5, 1960

2,920,035

PROCESS AND APPARATUS FOR INTRODUCING MATERIALS INTO A CONVERSION ZONE EMPLOYING A VARIABLE HEIGHT FEEDING ZONE

James L. Dwyer, Glenolden, Pa., assignor to Sun Oil Company, Philadelphia, Pa., a corporation of New Jersey Application December 30, 1955, Serial No. 556,623

15 Claims. (Cl. 208—167)

This invention relates to process and apparatus for introducing liquid reactants and granular conversion-supporting solids into a conversion zone.

In numerous industrial processes, liquid reactants are contacted in a conversion zone with granular conversion-supporting solids in order to effect some chemical reaction or conversion of the liquid reactants. Frequently, in such processes, the liquid reactants are vaporized by contact with the conversion-supporting solids, which are introduced into the conversion zone at an elevated temperature.

In one common type of operation, the granular solids gravitate through at least a portion of the conversion zone as a compact moving bed of solids, and vapors evolved from the liquid reactants are passed through this bed of solids, usually in a generally downward direction, to a level at which they are withdrawn from the conversion zone through suitable means as known in the art. The depth of the solid bed, above the point of withdrawal of the converted vapors, is often an important variable in the particular process involved, and it frequently becomes necessary or desirable to change the bed depth in order to accomplish a change in the overall effect of the process. The present invention provides a novel and highly satisfactory manner of accomplishing a change in the bed depth, without the necessity for interrupting the flow of reactants to, and the removal of reaction products from, the conversion zone.

Figures 1, 3:
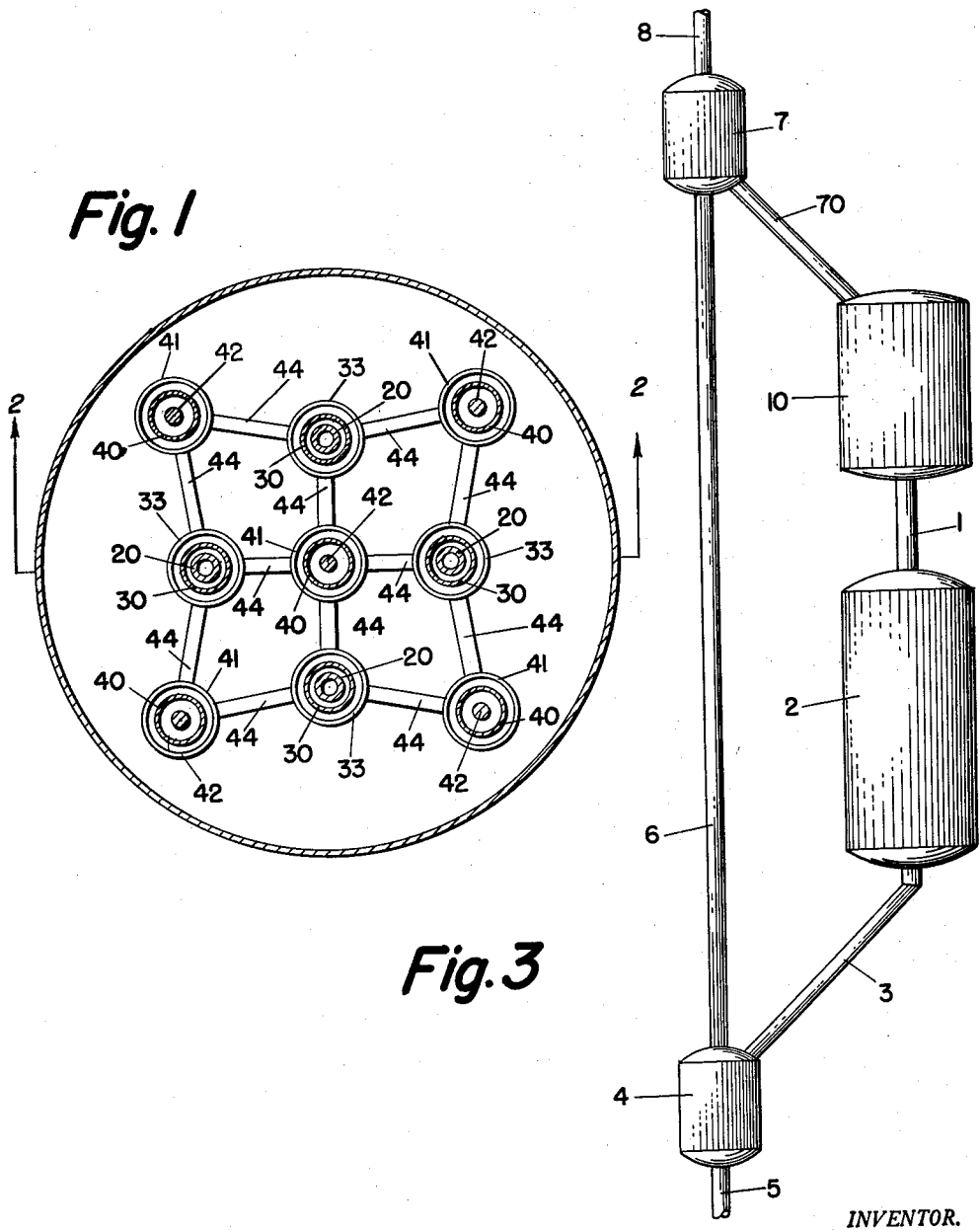
Figure 2:
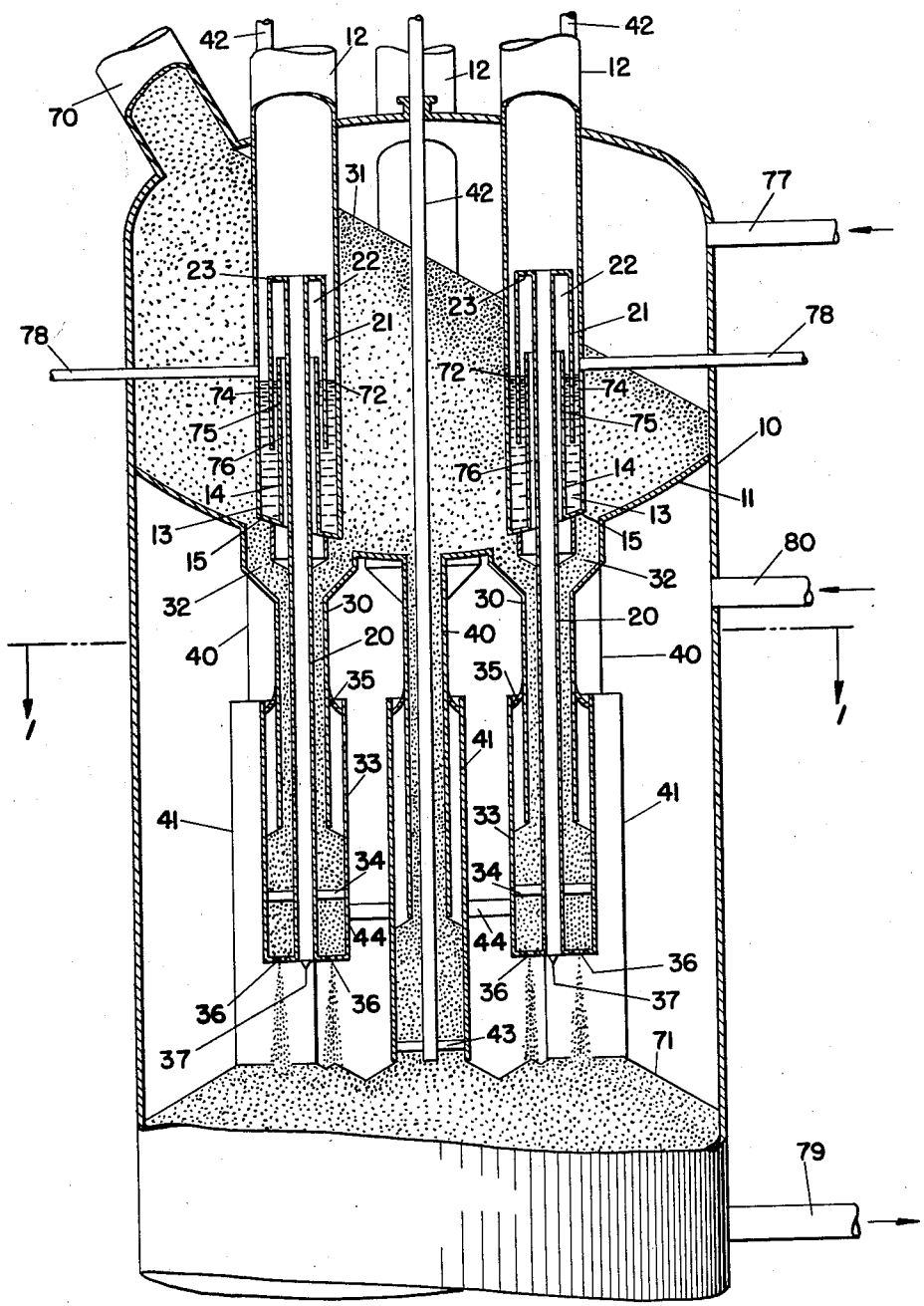

The invention will be more fully described with reference to the attached drawing, wherein Figures 1 and 2 are a sectional plan view and a sectional elevation view respectively of a conversion vessel according to the invention, and Figure 3 is a schematic diagram of a hydrocarbon conversion system including such conversion vessel.

Referring now to Figures 1 and 2, a conversion vessel 10 is represented therein, which is divided into upper and lower portions by the transverse baffle 11. Extending downwardly through the top of vessel 10 are four stationary liquid conduits 12. Each of these stationary liquid conduits communicates in a lower portion thereof with an annular receptacle 13 for sealing liquid as subsequently described. The inner walls of the annular receptacles are designated by the numeral 14. Each of the annular receptacles is closed at the bottom by a member 15.

Four movable liquid conduits 20 have their upper portions positioned within a lower portion of the corresponding stationary liquid conduits 12. Each of the movable liquid conduits has a sleeve 21 associated therewith and providing an annular vapor space 22 with each movable liquid conduit. These annular vapor spaces are closed at the top by means of members 23. The upper portions of the annular receptacle walls 14 are positioned between lower portions of the corresponding sleeves 21 and the movable liquid conduits 20.

Surrounding a lower portion of each of the four movable liquid conduits is a stationary solids conduit 30. Each of these stationary solids conduits is adapted to receive granular solids in compact form flowing from the bed 31 above partition 11 into the annular spaces represented in Figure 2 by the numeral 32. Surrounding the lower portions of the stationary solids conduits are four movable solids conduits 33. Each of these conduits is secured to the corresponding movable liquid conduit by means of struts 34. Each of the movable conduits is slidably associated with the corresponding stationary solids conduit 30, and guides 35, attached to the corresponding movable solids conduit and adapted to move over the outer surface of the stationary solids conduit, aid in the sliding motion.

At the bottom of the annular space provided between each pair of movable solids conduits and movable liquid conduits are orifices 36, adapted for the flow of solids therethrough. At the bottom of each movable liquid conduit is a conventional nozzle, represented only very schematically by the numeral 37, adapted to spray liquid materials in a downward and lateral direction into the granular solids falling beneath the various orifices.

Also positioned in the lower portion of conversion vessel 10 are five additional stationary solids conduits 40. Surrounding a lower portion of each of these solids conduits is a movable solids conduit 41. Each movable solids conduit is slidably associated with the corresponding stationary solids conduit in a manner generally similar to that previously described for the other four pairs of stationary solids conduits and movable solids conduits.

Associated with each of the five additional pairs of stationary solids conduits and movable solids conduits is a shaft 42, extending downwardly through the top of conversion vessel 10 and having its lower end secured to the lower end of the corresponding movable solids conduit by means of struts 43.

The various movable solids conduits are secured to one another, in a pattern as shown in Figure 1, by means of struts 44. In particular, each of the four movable solids conduits which is not secured directly to one of the shafts 42 is secured to two of the movable solids conduits which are secured to one of the shafts 42.

In operation, preheated granular solids are introduced into the upper portion of conversion vessel 10 through line 70 and gravitate downwardly through that upper portion as a compact moving bed 31. The solids then flow downwardly into each of the nine stationary solids conduits and flow therethrough as annular compact beds. The solids then flow downwardly through the movable solids conduits as a lower annular compact bed. Solids are discharged from each of the movable solids conduits 33 through the corresponding orifices 36, and are discharged from each of the movable solids conduits 14 through the open lower ends thereof. The solids discharged through the latter set of movable solids conduits establish the upper surface of a compact bed 71 which gravitates through a lower portion of conversion vessel 10. This upper surface is beneath the lower ends of the movable solids conduits 33, so that the solids discharged through the orifices at the lower ends of those conduits pass in a falling curtain through the intervening space onto the upper surface of the bed 71.

Liquid reactants, for example heavy petroleum hydrocarbons, are introduced through each of the stationary liquid conduits 12 into the corresponding movable liquid conduits 20, and are discharged from the latter through the nozzles 37 into the falling curtain of solids surrounding each nozzle. Vapors are evolved from the liquid reactants upon contact with the preheated solids and pass downwardly through the solids bed 71. Additional cracking charge in vapor form is introduced into the conversion vessel through line 80, and these vapors also pass downwardly through bed 71. Chemical conversion of the reactants occurs upon contact with the solids, and the reaction products are removed from conversion vessel 10 through line 79.

A sealing liquid, for example molten lead, is maintained in the annular receptacles 13 at a level represented by the numeral 72. In the annular spaces 74, an interface is maintained between sealing liquid below and hydrocarbon reactants above. In the annular spaces 75 an interface is maintained between sealing liquid below and sealing vapors, e.g. steam, above, the latter having been introduced through line 77 into the upper portion of conversion vessel 10, and having passed through the bed 31 into the annular spaces 76, and thence into the annular spaces 75.

When it is desired to raise or lower the level of the solids bed 71 in the lower part of conversion vessel 10, this is accomplished, without interrupting the flow of solids, reactants, and reaction products through the apparatus, by raising or lowering the shafts 42, the result being to raise or lower simultaneously, as a result of the provision of the various connecting struts, all of the movable solids conduits and all of the movable liquid conduits. The movement of the movable liquid conduits causes the positioning of the annular liquid receptacles and the annular vapor spaces relative to each other to change, but the liquid seal is maintained at all times, and there is therefore no disruption of the operation of the apparatus occasioned by the movement of the movable liquid conduits.

In this respect, the present invention provides a superior operation to any that could be obtained without the use of the various annular spaces between the stationary liquid conduits and the movable liquid conduits and without the use of a sealing liquid as described.

Additional liquid reactants are introduced through the conduits 78 into the annular spaces 74, just above the upper surface of the sealing liquid, in order to provide a flow of liquid reactants upwardly through the upper portions of the annular spaces 74, thereby to prevent excessive coking of liquid reactants in those upper portions.

The invention is generally applicable to processes wherein granular solids and liquid reactants are introduced into a conversion vessel, and wherein it is necessary or desirable to occasionally change the level of a bed of solids within the conversion vessel. A particularly advantageous use of the invention occurs in processes for the conversion of petroleum hydrocarbons by means of granular conversion-supporting catalyst. Such processes are in general well known in the prior art, and the invention is generally applicable to all such processes. The chemical nature of the granular conversion-supporting solids may vary considerably, and the various types are well known in the art. Conversion-supporting solids which are commonly employed in catalytic cracking operations include for example synthetic silica-alumina catalyst, activated clay catalyst, etc. The solids which are employed in catalytic cracking processes involving the use of compact moving beds of catalyst usually comprise a major proportion of solids which are too large to pass through a 20 mesh U.S. Sieve Series Screen.

Referring now to Figure 3, such solids are removed through line 1 from conversion vessel 10, regenerated by conventional oxidation procedures in regenerator 2, introduced through line 3 into pneumatic lift engager vessel 4, elevated through conduit 6 by means of lifting gas under pressure introduced through line 5, separated from lifting gas in disengager vessel 7, and re-introduced into conversion vessel 10 through line 70; lifting gas is removed from vessel 7 through line 8. Figure 3 is merely illustrative of a type of system to which the invention may advantageously be applied, and does not show any details of the invention.

The process and apparatus according to the invention have been described with reference to the use of four liquid injection nozzles and five catalyst downcomers. It is to be understood that any suitable number of liquid injection nozzles and of catalyst downcomers can be employed, in any suitable arrangement within the conversion vessel. Frequently, it will be desired to employ a larger number than that shown in the drawing, the latter being restricted to the relatively smaller number in the interests of clarity.

Any suitable sealing liquid can be employed in carrying out the present invention. The sealing liquid should be chemically inert with regard to the liquid reactants, and should also be chemically stable and relatively non-volatile at the temperatures employed in the process, which, in the case of catalytic cracking of petroleum is generally within the approximate range from 800° F. to 1000° F. The sealing liquid is also preferably a relatively dense material, and must in any case have greater specific gravity than the liquid reactants at the temperatures involved.

The annular receptacle for sealing liquid is preferably positioned within the bed of solids in the upper part of the conversion zone, in the case where the solids are at elevated temperature and the sealing liquid is a normally solid material, since heat from the solids can thus be used to maintain the sealing material in liquid phase. However, in suitable cases, it is within the scope of the invention for the annular receptacle for sealing liquid to be positioned outside the conversion vessel, or in any other suitable location.

The raising and lowering of the various movable conduits can be accomplished in any suitable manner, for example by means of positioning engines located above the conversion vessel and connected to the shafts 42. Generally, it will be desired to move the various shafts 42 simultaneously in order to provide a uniform level of the various movable conduits. The moving should be gradual, particularly when the conduits are lowered, in order to avoid excessive attrition of the solids beneath the movable conduits.

The invention claimed is:

1. Apparatus for introducing liquid reactants and granular conversion-supporting solids into a conversion zone which comprises: a downwardly extending vertically movable liquid conduit having its lower end positioned within the conversion zone housing and adapted to discharge liquid reactants from said lower end; a downwardly extending vertically movable solids conduit surrounding at least a portion of said liquid conduit and having its lower end positioned within the conversion zone housing; means for supplying liquid reactants to said movable liquid conduit; separate means for supplying granular conversion-supporting solids to said movable solids conduit; and means for moving said liquid conduit and said solids conduit in a vertical direction relative to the conversion zone housing.

2. Apparatus for introducing liquid reactants and granular conversion-supporting solids into a conversion zone which comprises: a downwardly extending movable liquid conduit having its lower end positioned within the conversion zone housing; a downwardly extending stationary liquid conduit having a lower portion thereof communicating with an upper portion of said movable liquid conduit; an annular receptacle for liquid communicating with the interior of said stationary liquid conduit and surrounding a portion of said movable liquid conduit; means for preventing liquid reactants from passing from said receptacle and from said stationary liquid conduit, through the space between said movable liquid conduit and said stationary liquid conduit, into the conversion zone housing; a movable solids conduit having its lower end positioned within the conversion zone housing; and means for moving said liquid conduit and said solids conduit in a vertical direction relative to the conversion zone housing.

3. Apparatus for introducing liquid reactants and granular conversion-supporting solids into a conversion zone which comprises: a downwardly extending stationary liquid conduit whose interior communicates in a lower portion thereof with an annular receptacle for sealing liquid; a downwardly extending movable liquid conduit having its lower end positioned within the conversion zone housing, a portion of the movable liquid conduit being positioned within a portion of the stationary liquid conduit in spaced relation to the inner wall of the annular receptacle; a sleeve around and forming an annular vapor space with an upper portion of the movable liquid conduit, which vapor space is closed at the top, a portion of the inner wall of the annular receptacle being positioned within a portion of the annular vapor space; a stationary annular conduit for granular conversion-supporting solids surrounding at least a portion of the movable liquid conduit; a movable annular conduit for granular conversion-supporting solids slidably associated with and adapted to receive solids from the stationary annular conduit and surrounding at least a portion of the movable liquid conduit, the outer wall of the movable annular conduit being secured to the movable liquid conduit; and means for moving the movable liquid conduit and movable annular conduit in a vertical direction relative to the conversion zone housing.

4. Apparatus according to claim 3 and additionally comprising a second conduit for granular conversion-supporting solids, which conduit is spaced apart from the movable liquid conduit and the annular conduit for solids and has its lower end positioned beneath the lower end of the movable liquid conduit, the conduit for solids being attached to the movable liquid conduit.

5. Apparatus according to claim 4 wherein the means for moving comprise a shaft positioned within and coaxial with the second conduit for solids and secured to the second conduit for solids, which shaft is adapted to be moved vertically from outside the conversion vessel.

6. Apparatus according to claim 3 wherein means are provided for introducing liquid reactants into the annulus between the stationary liquid conduit and the outer wall of the annular vapor space, at a level beneath the upper end of said annulus, thereby to provide a flow of liquid reactants upwardly through said annulus.

7. Apparatus according to claim 3 and additionally comprising means at the lower end of the movable liquid conduit for spraying liquid reactants into a falling curtain of solids beneath the lower end of the annular conduit for solids.

8. Process for introducing liquid reactants and granular conversion-supporting solids into a conversion zone which comprises: passing liquid reactants downwardly through a conduit into the conversion zone; passing granular solids downwardly as a compact mass through a second conduit surrounding at least a portion of the first-named conduit, and then downwardly beneath the second conduit as a compact gravitating bed of said solids; maintaining the introduction of solids downwardly into the second conduit at a rate, relative to the rate of withdrawal of solids downwardly from the compact gravitating bed, to provide a curtain of solids falling beneath the lower end of the second conduit onto the surface of the compact gravitating bed; spraying liquid reactants from the first-named conduit into the falling curtain; and moving the first-named conduit and the second conduit in a vertical direction relative to the conversion zone housing, during such passage of solids and liquid reactants through the respective conduits, thereby to change the position of said first-named conduit and said second conduit relative to said housing at a given temperature.

9. Process for introducing liquid reactants and granular conversion-supporting solids into a conversion zone which comprises: passing liquid reactants downwardly through a stationary liquid conduit and then through a movable liquid conduit into the conversion zone; maintaining a body of liquid within a sealing zone communicating with the interior of the stationary liquid conduit and surrounding a portion of the movable liquid conduit; preventing liquid reactants from passing from said sealing zone and from said stationary liquid conduit, through the space between said movable liquid conduit and said stationary liquid conduit, into the conversion zone; passing granular solids downwardly through a movable solids conduit into the conversion zone, and then downwardly beneath the solids conduit as a compact gravitating bed of said solids; maintaining the introduction of solids downwardly into the solids conduit at a rate, relative to the rate of withdrawal of solids downwardly from the compact gravitating bed, to provide a curtain of solids falling beneath the lower end of the solids conduit onto the surface of the compact gravitating bed; spraying liquid reactants from the movable liquid conduit into the falling curtain; and moving the movable liquid conduit and the movable solids conduit in a vertical direction relative to the conversion housing, during such passage of solids and liquid reactants through the respective conduits, thereby to change the position of said movable liquid conduit and said movable solids conduit relative to said housing at a given temperature.

10. Process for introducing liquid reactants and granular conversion-supporting solids into a conversion zone which comprises: passing liquid reactants downwardly through a stationary liquid conduit and then downwardly through a movable liquid conduit; discharging liquid reactants from the movable liquid conduit into the conversion zone; gravitating granular conversion-supporting solids through a confined path surrounding at least a portion of the movable liquid conduit, and then downwardly beneath the confined path as a compact gravitating bed of said solids; maintaining the introduction of solids downwardly into the confined path at a rate, relative to the rate of withdrawal of solids downwardly from the compact gravitating bed, to provide a curtain of solids falling beneath the lower end of the confined path onto the surface of the compact gravitating bed; spraying liquid reactants from the movable liquid conduit into the falling curtain; moving the movable liquid conduit in a vertical direction relative to the conversion zone housing, thereby to change the level of discharge of liquid reactants relative to said housing at a given temperature; maintaining sealing vapors in a first annular space surrounding a portion of the movable liquid conduit; maintaining an interface between sealing vapors above and sealing liquid below in a second annular space surrounding at least a portion of the first annular space; maintaining an interface between liquid reactants above and sealing liquid below in a third annular space surrounding at least a portion of the second annular space; the second annular space communicating at its upper end with the first annular space and at its lower end with the third annular space; and the third annular space communicating with the interior of the stationary liquid conduit.

11. Process according to claim 10 wherein liquid reactants are introduced into the stationary liquid conduit at a position adjacent the interface between the sealing liquid and the liquid reactants, thereby to provide a flow of liquid reactants upwardly through the third annular space.

12. Apparatus according to claim 1 wherein said separate means for supplying granular conversion-supporting solids comprises a transverse partition within said housing and providing thereabove an upper chamber adapted to contain an upper gravitating compact bed of granular solids, and a downwardly extending stationary solids conduit having its upper end secured within an opening in said transverse partition, a lower portion of said stationary solids conduit being positioned within an upper portion of said movable solids conduit and surrounding a portion of said movable liquid conduit.

13. Apparatus for introducing liquid reactants and granular conversion-supporting solids into a conversion zone which comprises: a downwardly extending movable liquid conduit having its lower end positioned within the conversion zone housing; a downwardly extending stationary liquid conduit having a lower portion thereof communicating with and surrounding an upper portion of said movable liquid conduit; a first sleeve positioned within a lower portion of said stationary liquid conduit and surrounding a portion of said movable liquid conduit; an annular bottom closure between the lower end of said first sleeve and the lower end of said stationary liquid conduit; a second sleeve surrounding an upper portion of said movable liquid conduit and positioned between an upper portion of said first sleeve and said stationary liquid conduit; an annular top closure between the upper end of said second sleeve and the upper end of said movable liquid conduit; a movable solids conduit surrounding and secured to a lower portion of said movable liquid conduit and having its lower end positioned within the conversion zone housing; and means for moving said movable liquid conduit and said movable solids conduit in a vertical direction relative to the conversion zone housing.

14. Apparatus for introducing liquid reactants and granular conversion-supporting solids into a conversion zone which comprises: a first downwardly extending vertically movable solids conduit having its lower end positioned within the conversion zone housing; a second downwardly extending vertically movable solids conduit spaced laterally apart from the first conduit and having its lower end positioned within the conversion zone housing and beneath the lower end of the first conduit; means for moving the first and second conduits vertically relative to the conversion zone housing; and means for spraying liquid hydrocarbons into solids falling beneath the lower end of the first conduit.

15. Process for introducing liquid reactants and granular conversion-supporting solids into a conversion zone which comprises: passing granular solids downwardly as a compact mass through a first conduit into a compact bed of gravitating solids therebeneath; passing granular solids downwardly through a second conduit spaced laterally apart from the first conduit and onto the upper surface of said bed; maintaining the introduction of solids downwardly into the second conduit at a rate, relative to the rate of withdrawal of solids downwardly from the compact gravitating bed, to provide a curtain of solids falling beneath the lower end of the second conduit onto the surface of the compact gravitating bed; spraying liquid reactants into the falling curtain and moving the first and second conduits relative to the conversion zone housing, during passage of solids through the first and second conduits, thereby to change the position of the first and second conduits relative to said housing at a given temperature.

References Cited in the file of this patent

UNITED STATES PATENTS

| | | |
|---|---|---|
| 2,446,986 | Simpson | Aug. 10, 1948 |
| 2,452,172 | Willard | Oct. 26, 1948 |
| 2,672,407 | Leffer | Mar. 16, 1954 |
| 2,726,938 | Lassiat | Dec. 13, 1955 |
| 2,766,187 | Bergstrom | Oct. 9, 1956 |

FOREIGN PATENTS

| | | |
|---|---|---|
| 280,219 | Germany | May 29, 1914 |
| 501,765 | Great Britain | Mar. 6, 1939 |